United States Patent [19]

Johnson et al.

[11] 4,292,661
[45] Sep. 29, 1981

[54] POWER AND CONTROL SYSTEM ARRANGEMENT FOR TRANSPORT REFRIGERATION UNIT

[75] Inventors: Dannis R. Johnson, Prior Lake; Elgin J. Foster, Credit River Twp., Scott County; Richard J. Soukup, Lakeville, all of Minn.

[73] Assignee: Thermo King Corporation, Minneapolis, Minn.

[21] Appl. No.: 79,013

[22] Filed: Sep. 26, 1979

[51] Int. Cl.³ ............................................... H02B 1/04
[52] U.S. Cl. .................................... 361/393; 361/338; 361/391
[58] Field of Search ............... 361/331, 332, 334, 338, 361/356, 391, 393, 394, 426, 385, 392, 428

[56] References Cited
U.S. PATENT DOCUMENTS

| | | | |
|---|---|---|---|
| 2,498,807 | 2/1950 | Hagenbach | 361/332 |
| 3,717,805 | 2/1973 | Gnaedinger | 361/338 |
| 4,124,877 | 11/1978 | Vollenweider | 361/393 |
| 4,179,724 | 12/1979 | Bonhomme | 361/391 |

*Primary Examiner*—Gerald P. Tolin
*Attorney, Agent, or Firm*—E. C. Arenz

[57] ABSTRACT

A transport refrigeration unit is provided with a control box 16 arrangement in which a hard-wired electrically passive assembly of receptacles 23, 24 and electrical terminal strips 25-27, and interconnecting wires 28-30 at the rear wall 18 of the box is arranged to be electrically connected to the interface module 33 through the plugs 39, 40 being received in the passive assembly receptacles, the interface module having both high voltage and low control voltage elements 41-48, the interface module also having a forwardly facing low voltage receptacle 49 which receives the front module 33 plugs 60 at the rear of the front module, the front module having only low control voltage elements 61-63 and a door 73 for the box provided with control switches 75 connected through wiring 76 and plug 78 to receptacle 79 so that all of the electrical elements of the front module and the door are of low control voltage. The modules 33, 34 are supported from rails 31, 32 as they are slipped into the box, and jack screws 37 and 52 hold the modules securely in place.

6 Claims, 7 Drawing Figures

POWER AND CONTROL SYSTEM ARRANGEMENT FOR TRANSPORT REFRIGERATION UNIT

FIELD AND BACKGROUND OF THE INVENTION

This invention pertains to the art of providing a control box and electrical wiring arrangement for the electrical power and control system for a transport refrigeration unit.

Transport refrigeration units, such as are used to refrigerate freight containers and trailers, may take various forms with respect to their power sources and control systems. A typical transport refrigeration unit, adapted for use on a container which may alternatively be carried aboard ship at sea, or by truck or train on land, will be arranged to be powered either from an electrical power source when available, or by an internal combustion engine when suitable electrical power is not available. Thus, when the containers are aboard ship or at dock side, the refrigeration units will usually be powered by an electrical source from the ships power or from dockside power. When being transported by truck on land, the units will usually be powered by the internal combustion engines.

These units are reasonably sophisticated in order to properly carry out their functions and accordingly contain a fairly large number of control elements associated with both the refrigeration system and the engine circuit, these elements including both controlling and indicating elements. Since the value of the refrigerated cargo carried will usually some multiple of the value of the refrigeration unit itself, it is relatively important that failures and malfunctions of the refrigeration unit be repairable ordinarily within a reasonable time. Since the repair or replacement of parts may also have to be carried out under adverse conditions at times, such as when the unit is refrigerating a container which may be at the top of a stack of container units aboard ship, the arrangement should be such that the replacement of parts can be easily and quickly effected.

To promote repair and replacement of malfunctioning control elements, there is usually an effort to locate together those control elements not required to be located remotely because of their function. With most of the control elements centralized at what is called a control box, it is apparent that a fairly common reason for a malfunction of the unit as a whole will be as a result of failure of one of these centrally located elements.

Accordingly, it is among the aims of the invention to provide a control box arrangement of wiring and controls at the control box which facilitates repair and replacement of any parts, and which also is arranged to promote safety during the repair and operation of the units. Also the arrangement is intended to permit the quick determination of any assembly of parts which requires repair or replacement.

SUMMARY OF THE INVENTION

In accordance with the invention the power and control system arrangement for a transport refrigeration unit, which utilizes both high and low voltage for operation and control, includes an open face control box with a hard-wired electrically passive assembly comprising a plurality of both high and low voltage terminals and both high and low voltage plug-in receptacles at the rear wall of the box, a unitary interface module with both high and low voltage plugs adapted to be received by the passive assembly receptacles, the interface module having both high and low voltage electrically operable components and having low voltage plug-in recptacle means, a separate unitary front module having low voltage plug-in means received by the low voltage plug-in receptable means of the interface module and carrying electrical elements solely low voltage character, a separate cover for the box carrying electrical components including switch means for controlling operation of the unit, wiring means for detachably connecting the switch means of the cover to the front module, and means for supporting and releasably securing the modules in stacked relation in the box with the interface module plugged in and electrically connected to the passive assembly solely by the plugged-in relation, and the front module plugged in and electrically interconnected to the interface module solely by the plugged-in relation, and the cover electrical components being electrically connected to said front module solely by the wiring means.

DESCRIPTION OF THE PREFERRED EMBODIMENT

Figure 1:
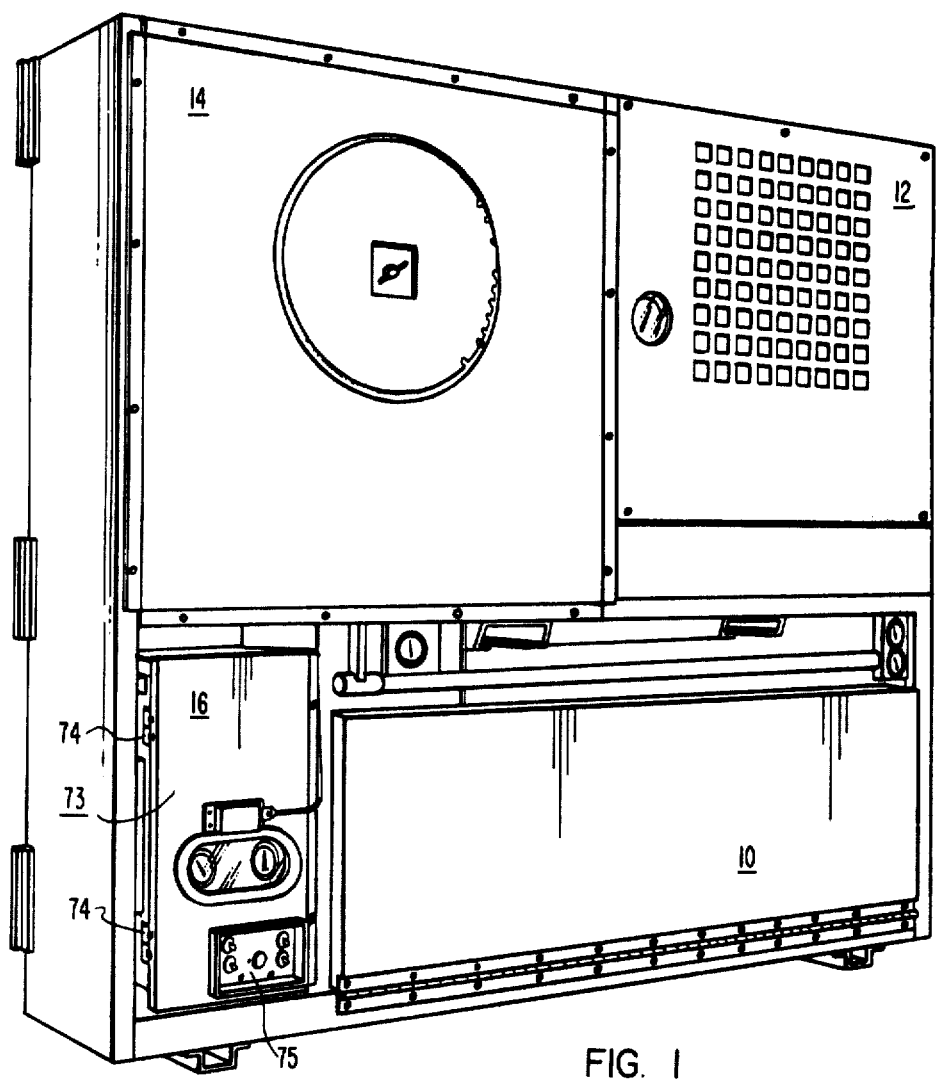
FIG. 1 is a front perspective view of one type of transport refrigeration unit in which the invention may be employed.

The transport refrigeration unit shown in FIG. 1 is especially adapted to be used to refrigerate freight containers of the type which can be transported by ship or by land vehicles. The invention will be described in connection with this particular unit which is adapted to be powered by either a diesel engine or from an electrical source, although it will be understood that the invention is applicable to other transport refrigeration units such as those which rely solely upon an electrical power source.

It is not considered necessary to describe in any particular detail the refrigeration unit as a whole. To the extent that an understanding of details is considered necessary, reference should be had to copending U.S. Patent Application Ser. No. 079,014, filed Sept. 26, 1979.

The unit is generally divided into three main sections, the lower part 10 extending across the width of the unit, and the upper right and left parts, 12 and 14, respectively. The lower part 10 is herein called the power compartment and houses, in the space behind the swing-down door, an in-line power package comprising a diesel engine, electric motor-generator, and a refrigeration compressor, (none of which are shown). The left end of the power compartment is occupied by the control box 16 which is the basic subject of this invention and will be described in considerable detail hereinafter. The upper right part 12 constitutes what is herein called the condenser compartment and houses an electric motor driven condenser fan, a condenser coil and a radiator coil (none of which are shown). The upper left part 14 is the evaporator compartment and contains electric motor driven evaporator fans, and a refrigerant evaporator coil (none shown).

Figure 2:
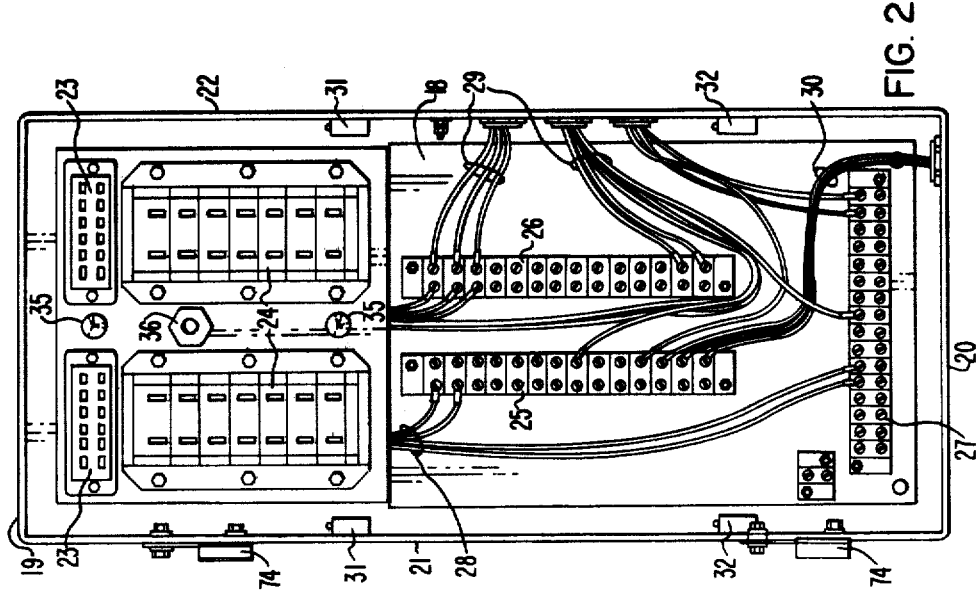
FIG. 2 is a front elevation of a control box with the cover, front module, and interface module removed, and with only representative parts of the hard wiring being shown.

As noted before, localizing the control elements is considered to provide distinct advantages localizing the control elements, and to the extent that this can reasonably be done in this unit, they are so centralized at the control box 16. Referring to FIG. 2, the arrangement includes a forwardly open enclosure or box having a rear wall 18, top and bottom walls 19 and 20, and left and right sidewalls 21 and 22. A pair of low voltage plug-in receptacles 23 and a pair of high voltage plug-in receptacles 24 are secured to the rear wall 18 in the upper portion of the box. A plurality of electrical terminal strips 25, 26 and 27, each having multiple terminals are also fixed to the rear wall. Only a few wires which interconnect the strips and receptacles, and also lead from the box to other locations have been shown as representative of the wiring. However, for purposes of example, the wires 28 are representative of those connecting strips to the receptacles, while wires 29 are representative of those in wiring harnesses which lead from selected terminals on the strips through the right side wall 22 to remote locations within the refrigeration unit. Examples (not inclusive) of remotely located elements required to be connected through harnesses such as 29 to the control box are: refrigerant pressure cutouts and switches; engine starter solenoid and water and oil temperature switches in the engine section; fan motors, defrost termination switch and high temperature safety switch for example in the evaporator and condenser sections. In addition to the noted wiring harnesses which exit from the box to unit components, the wires 30 connect three terminals on strip 25 with the main electrical power source, whether it be remote from the unit or whether it be the power derived from the generator of the motor-generator.

It will be appreciated from the foregoing that the arrangement described at the rear of the control box constitutes a hard wired assembly in that all of the wiring is fixed to terminals and need not be disconnected upon the electrical disconnection of this assembly from other parts of the overall electrical circuitry. The assembly is also herein termed a passive assembly in that it constitutes terminals and receptacles with no parts of the assembly functioning other than for purposes of electrical connections.

Both of the sidewalls 21 and 22 of the box are provided with upper horizontally extending rails 31 and lower horizontally extending rails 32 which serve to support interface module 33 (FIGS. 3 and 4) and the front module 34 (FIGS. 5 and 6) upon their being slipped into place in the control box. The rear of the control box is also provided with several forwardly projecting guides 35 (FIG. 2) to aid in insuring that when the interface module is installed in the box the alignment between the plugs and receptacles will be obtained. Additionally, a jack screw nut 36 is provided on the receptacle assembly in a location to receive a complementary jack screw 37 (FIG. 4) projecting from the rear face of the interface module 33.

Figure 4:
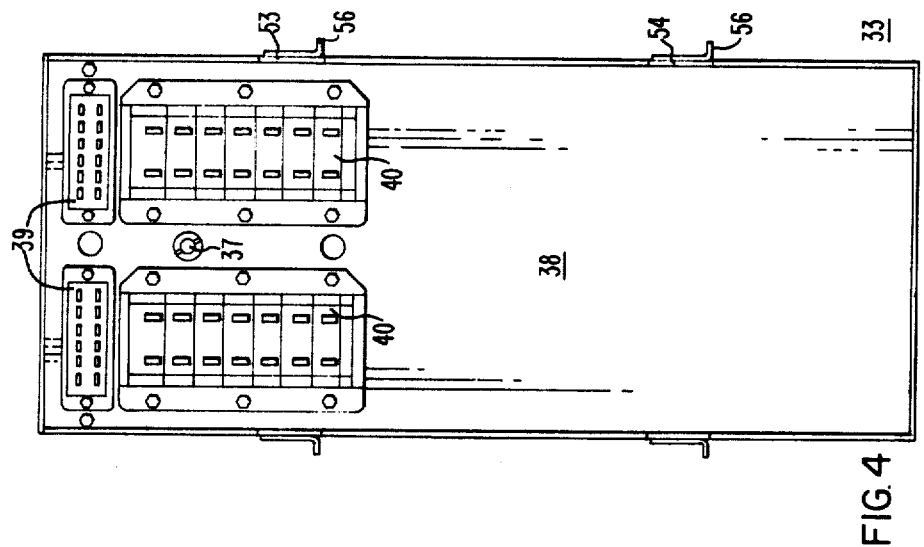
FIG. 4 is a rear elevation of the interface module.
Figure 3:
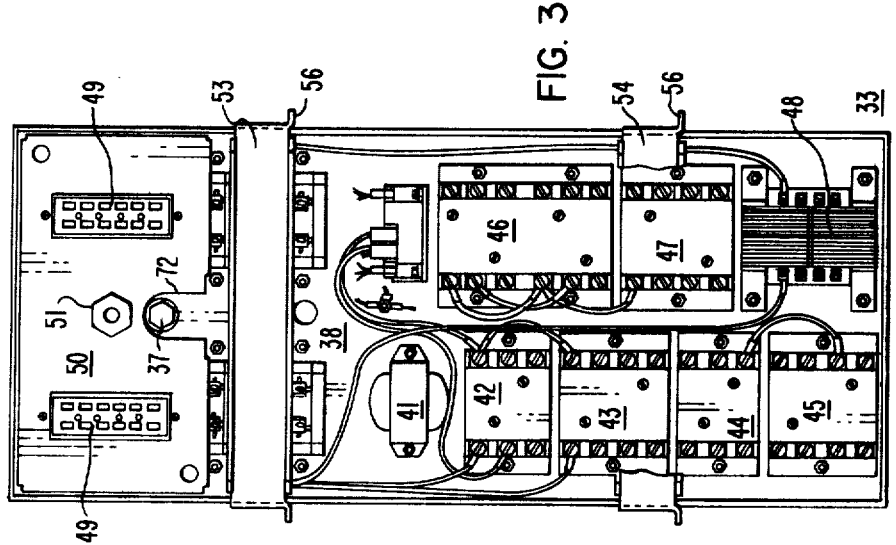
FIG. 3 is a front elevation of the interface module, again with only representative parts of the wiring being shown.

Referring now to FIGS. 3 and 4, the interface module 33 has the general outline form of a rectangular box formed by top, bottom and opposite sidewalls, and a recessed mounting wall 38. The mounting wall carries low voltage plugs 39 and high voltage plugs 40, these plugs being positioned so that upon the module being slipped into the control box 16, the plugs are received by the low and high voltage receptacles 23 and 24 of the passive assembly at the rear of the control box. As in the case of the wiring assembly of FIG. 2, only part of the wiring is shown in FIG. 3. The main elements seen in FIG. 3 include a first transformer 41, an electric contactor 42, a motor contactor 43, a heater contactor 44, a booster contactor 45, an evaporator fan motor contactor 46, a condenser fan motor contactor 47 and a second transformer 48. The interface module 43 is also provided on its front face with a low voltage plug-in receptacle arrangement 49, the receptacle-supporting-panel 50 being provided with a jack screw nut 51 adapted to receive the jack screw 52 (FIG. 6) at the rear of the front module 34.

The interface module is provided with both upper and lower U-shaped combination slide and handle members 53 and 54, respectively, fastened to the sidewalls of the module. The sidewall portions include lower flanges 56 which are supported by the rails 31 and 32 (FIG. 2) of the control box when the interface module is slid into position in the box. The front portions of the slide-handles function as handles which facilitate manipulating the modules in inserting and removing them, and in stacking them for storage.

The interface module is herein termed a unitary module in that it is complete unto itself, with all of the wiring being internal so that the connections made between it and the passive assembly of the enclosure, as well as the connections made to it by the front module 34 are solely by way of plugs and receptacles. Module 33 is also characterized herein as a interface module in that it interfaces between the fixed passive assembly in the control box which has both low and high voltages, with the front module 34 which has only low voltage elements.

Figure 6:
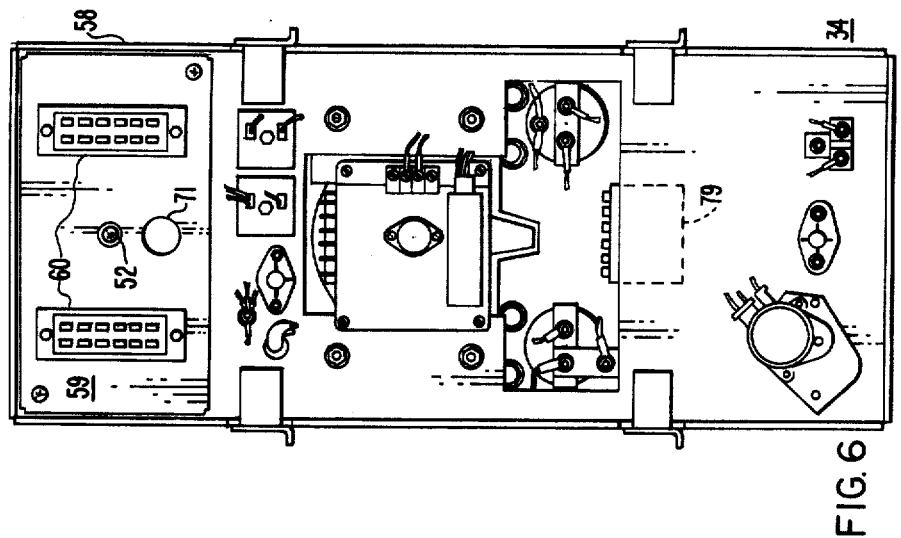
FIG. 6 is a rear elevation of the front module, partly diagrammatic and omitting various parts and wiring.
Figure 5:
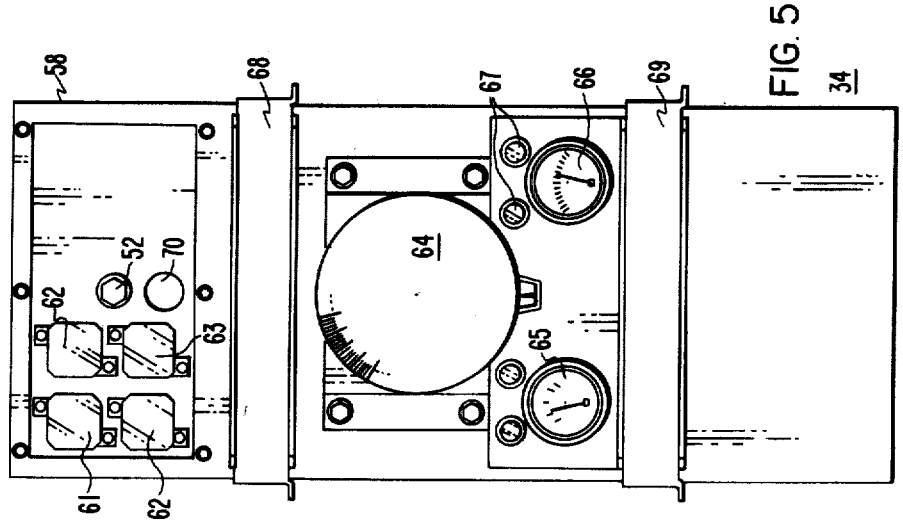
FIG. 5 is a front elevation of the front module.

Turning now to FIGS. 5 and 6, the front module 34 has a rectangular outer frame 58 similar to that of the interface module and has an upper rear wall portion 59 carrying low voltage plug means 60 which are positioned to be received by the plug-in receptacles 49 (FIG. 3) at the front face of the interface module 33. As such, only the low control voltage, such as 16 volts, is available at the front module. In addition to the low voltage plugs carried by the front module, the module has a plurality of electrically operable elements associated with the control functions of the unit. Among the main elements seen on the front of the module 34 in FIG. 5, and shown partly diagrammatically, are: defrost relay 61; two changeover relays 62 which function to reconnect circuits in changes back and forth between diesel and electric power sources; a transformer shorting relay 63 which functions in connection with the charging circuit for the battery depending upon the mode of operation; a temperature control dial 64; an ammeter 66; a volt meter 65; and indicating lights generally designated 67. As in the case of other views, FIG. 5 and 6 are both partly diagrammatic and with a number of wires omitted to promote clarity. As with the interface module, the front module 34 is provided with U- shaped combination slide-handles 68 and 69 which function in the same way as the handles of the interface module.

Viewing FIG. 5, an opening 70 is provided in the upper front panel just below the jack screw 52. With the modules in place in the box as illustrated in the broken side elevation of FIG. 7, access may be had through the hole 70 and an aligned hole 71 in the panel 59 at the back of the front module and through a cutout 72 (FIG. 3) in the panel 50 to the jack screw 37 which holds the interface module to the rear assembly in the box. Thus, if desired both the front and interface module may be removed simultaneously by loosening simply the one jack screw 37.

It will be appreciated from the description of the arrangement that the front module, as in the case of the interface module, is a unit unto itself which may be removed as such with the only electrical connections between it and the interface module being the plug 60 and receptacles 49 of the interface module.

Figure 7:
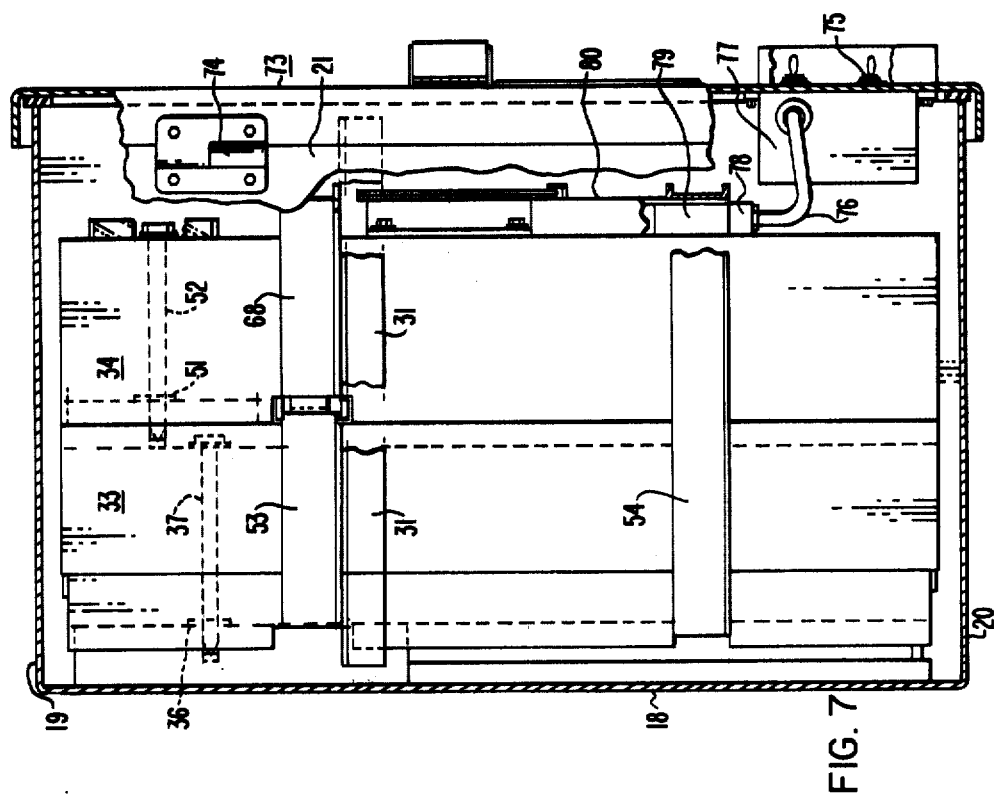
FIG. 7 is a partly broken side elevation of the control box with the modules and cover installed.

Referring to FIGS. 1 and 7, the cover 73 of the control box has a shallow pan-shaped form and is attached to the control box wall by upper and lower hinges 74 having one leaf attached to the box wall 21 and the other leaf attached to the cover flange. In one form, which may be preferred in connection with certain units, the hinges are of lift-off character in which the barrel of the hinge is carried by the box while the pin of the hinge is at the top and carried by the cover.

The main electrical elements carried by the door comprise the various operating switches shown in a cluster at 75 on the front of the door in FIG. 1. The functions of the switches are to determine operating mode (diesel or electric), to place the controls in an on or off condition, a preheat and start switch for the diesel, and a defrost switch. Additionally this door circuitry may include a circuit breaker and a safety switch. The wiring harness 76 (FIG. 7) connecting these switches to the front module 34 exits from an enclosed box 77 behind the front of the door and terminates in a plug 78 which is received by a plug-in receptacle 79 located immediately behind the overhanging central panel 80 (FIG. 5) of the front module.

The arrangement of the entire control box with modules 33 and 34 installed, and with the door 73 installed and all the plug-ins made is shown in FIG. 7. It will be seen that the side legs of the combination handles-slides are supported by the respective rails such as the upper one 31 shown, that the jack screw 37 turned into the nut 36 retains the interface module in position to the passive assembly at the rear, and that the jack screw 52 turned into the nut 51 retains the front module in position. The electrical connections between the interface module and passive assembly at the rear of the box are made solely by the plugs 39 and 40 being received by the receptacles 23 and 24. The electrical connections between the front module 34 and the interface module are made solely by the plugs 60 being received by the receptacles 49, and the sole electrical connection between the door switch arrangement 75 and the front module 34 is by means of the plug 78 received in the receptacle 79. With the front module having electrical elements of solely low voltage character, and with the switch means on the cover also being of solely low voltage for control purposes, safety to personnel is enhanced.

We claim:

1. A power and control system arrangement for a transport refrigeration unit which utilizes both high and low voltage for operation and control, comprising:
    an enclosure having walls and an open face;
    a hard-wired, electrically-passive assembly comprising a plurality of both high and low voltage terminals and both high and low voltage plug-in receptacles in the enclosure at the wall opposite the open face;
    a unitary interface module having both high voltage and low voltage plugs received by said passive assembly receptacles, said interface module having both high voltage and low voltage electrically operable components, and having low voltage plug-in receptacle means;
    a separate, unitary front module having low voltage plug-in means received by said low voltage plug-in receptacle means of said interface module, and carrying electrical elements of solely low voltage character;
    a separate cover for the enclosure carrying electrical components including switch means controlling operation of the refrigeration unit;
    wiring means detachably connecting said switch means to said front module;
    means for supporting and releasably securing said modules in stacked relation in said enclosure, with said interface module plugged in an electrically connected to said passive assembly solely by said plugged in relation, and said front module plugged in and electrically connected to said interface module solely by said plugged in relation, and said cover electrical components being electrically connected to said front module solely by said wiring means.

2. An arrangement according to claim 1 wherein said supporting and securing means includes:
    horizontal rails on the opposite sidewalls of said enclosure, and slides supported by said rails on said interface and front modules.

3. An arrangement according to claim 2 including:
    separate fastener means for independently securing said interface module to said enclosure, and said front module to said interface module, said fastener means for said interface module being accessible through said front module so that said modules can be removed in sequence or together.

4. An arrangement according to claim 2 wherein:
    said slides comprise opposite leg portions of U-shaped members having their bight portions spaced forwardly of said modules to serve as handles and to accommodate stacking of the modules.

5. An arrangement according to claim 1 wherein:
    said cover is secured to said enclosure by hinges along one vertical edge of said cover, said hinges being of the pintle type to permit said cover to be lifted off to separate it from said enclosure.

6. A power and control system arrangement for a transport refrigeration unit adapted for use on a refrigerated transport container:
    a forwardly-open box having a rear, top, bottom and side walls;
    a hard-wired electrically passive assembly of a plurality of electrical terminal strips, including high voltage and low voltage terminals thereon, and high voltage and low voltage plug-in receptacles, mounted at said rear wall of said box, and wiring interconnecting said strips and receptacles;

a unitary, interface module including high voltage and low voltage plugs on its rear face arranged to register with and being received by said high voltage and low voltage receptacles, respectively, said interface module carrying a plurality of electrically operable elements including contactor means and transformer means, and having a forward-facing low voltage plug-in receptacle;

a front module including low voltage plugs on its rear face arranged to register with and being received by said low voltage receptacle means, said front module carrying a plurality of electrically operable elements associated with control functions of said transport unit;

a detachable front cover closing the front of said box, said front cover carrying low voltage control switch means mounted on the cover and accessible from the front of said cover;

wiring means including a detachable plug at at least one end thereof interconnecting said control switch means with said front module;

means supporting said interface module and said front module in said box;

means releasably securing said modules in fixed relation in said box;

said arrangement thereby permitting the separation of said cover and low voltage control switch means, said low voltage front module, and said interface module, from said box and from each other and thus permitting their individual replacement.

* * * * *